(12) United States Patent
Futaki et al.

(10) Patent No.: US 9,930,551 B2
(45) Date of Patent: *Mar. 27, 2018

(54) RADIO COMMUNICATION SYSTEM, RADIO STATION, NETWORK OPERATION MANAGEMENT APPARATUS, AND NETWORK HEALING METHOD

(71) Applicant: NEC Corporation, Tokyo (JP)

(72) Inventors: Hisashi Futaki, Tokyo (JP); Kosei Kobayashi, Tokyo (JP); Sadafuku Hayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/336,575

(22) Filed: Oct. 27, 2016

(65) Prior Publication Data

US 2017/0055170 A1 Feb. 23, 2017

Related U.S. Application Data

(62) Division of application No. 14/385,425, filed as application No. PCT/JP2013/001759 on Mar. 15, 2013, now Pat. No. 9,516,523.

(30) Foreign Application Priority Data

Mar. 15, 2012 (JP) .................. 2012-058625

(51) Int. Cl.
*H04W 24/04* (2009.01)
*H04W 24/08* (2009.01)
*H04W 24/02* (2009.01)

(52) U.S. Cl.
CPC ........... *H04W 24/08* (2013.01); *H04W 24/02* (2013.01); *H04W 24/04* (2013.01)

(58) Field of Classification Search
CPC ..... H04W 24/00; H04W 24/02; H04W 24/04; H04W 24/10; H04W 84/18; H04B 17/00; H04B 17/15; H04B 17/16; H04B 17/18; H04B 17/19; H04B 7/24
USPC ...................... 455/424, 422.1, 507
See application file for complete search history.

(56) References Cited

U.S. PATENT DOCUMENTS 5,852,630 A 12/1998 Langberg et al.
5,949,759 A 9/1999 Cretegny et al.
(Continued)

FOREIGN PATENT DOCUMENTS

EP 2 154 918 A1 2/2010
EP 2 424 302 A1 2/2012
(Continued)

OTHER PUBLICATIONS

Japanese Office Action dated Apr. 19, 2017, by the Japanese Patent Office in counterpart JapanesePatent Application No. 2014-504716.
(Continued)

*Primary Examiner* — Siu Lee
(74) *Attorney, Agent, or Firm* — Finnegan, Henderson, Farabow, Garrett & Dunner, L.L.P.

(57) ABSTRACT

A radio communication system, a radio station, a network operation management apparatus, and a network healing method are provided that can suppress system performance degradation caused when a failure occurs in a radio base station, a network apparatus, or the like. In a radio communication system which includes multiple radio stations (10, 20) and a network operation management apparatus (30) managing the radio stations and in which network optimization is performed, at least one of a first radio station (10) in which a failure occurs, a second radio station (20) different from the first ration station, and the network operation management apparatus (30) sends alarm information regarding the failure.

21 Claims, 13 Drawing Sheets

SEQUENCE EXAMPLE 2
IN SECOND EXEMPLARY EMBODIMENT

(56) References Cited

U.S. PATENT DOCUMENTS

| | | |
|---|---|---|
| 2002/0196759 A1 | 12/2002 | Yuhan et al. |
| 2010/0234006 A1* | 9/2010 | Vadlamudi ............ H04W 24/04 455/418 |
| 2011/0053530 A1* | 3/2011 | Kenington ............ H04W 88/08 455/115.1 |
| 2011/0190016 A1 | 8/2011 | Hamabe et al. |
| 2012/0155321 A1 | 6/2012 | Yang et al. |
| 2012/0157089 A1* | 6/2012 | Yang ................... H04L 41/0645 455/424 |
| 2012/0163194 A1 | 6/2012 | Bertze |
| 2013/0083650 A1 | 4/2013 | Taleb et al. |
| 2013/0294281 A1 | 11/2013 | Lee et al. |
| 2015/0304900 A1 | 10/2015 | Qiu et al. |

FOREIGN PATENT DOCUMENTS

| | | |
|---|---|---|
| JP | 2002-215222 A | 7/2002 |
| JP | 2003-078938 A | 3/2003 |
| JP | 2006-191427 | 7/2006 |
| JP | 2010-258814 A | 11/2010 |
| JP | 2011-097295 | 5/2011 |
| JP | 2012-010056 | 1/2012 |
| WO | WO 2009/106138 A1 | 9/2009 |
| WO | WO 2011/046150 A1 | 4/2011 |
| WO | WO 2011/102767 A1 | 8/2011 |

OTHER PUBLICATIONS

Extended European Search Report dated Feb. 3, 2016, issued by the European Patent Office in counterpart European Patent Application No. 13761907.8.
3GPP TS 36.300 V10.5.0, Internet <URL> http:www.3gpp.org/ftp/Specs/html-info/36300.htm, Sep. 2011.
3GPP TS 32.541 V10.0.0, (Internet <URL> http:www.3gpp.org/ftp/Specs/html-info/32541.htm), Mar. 2011.
International Search Report and Written Opinion dated Jun. 4, 2013.
Notice of Reasons for Refusal dated Dec. 6, 2017, issued by the Japanese Patent Office in counterpart Japanese Patent Application No. 2014-504716.

* cited by examiner

SEQUENCE EXAMPLE IN FIRST EXEMPLARY EMBODIMENT

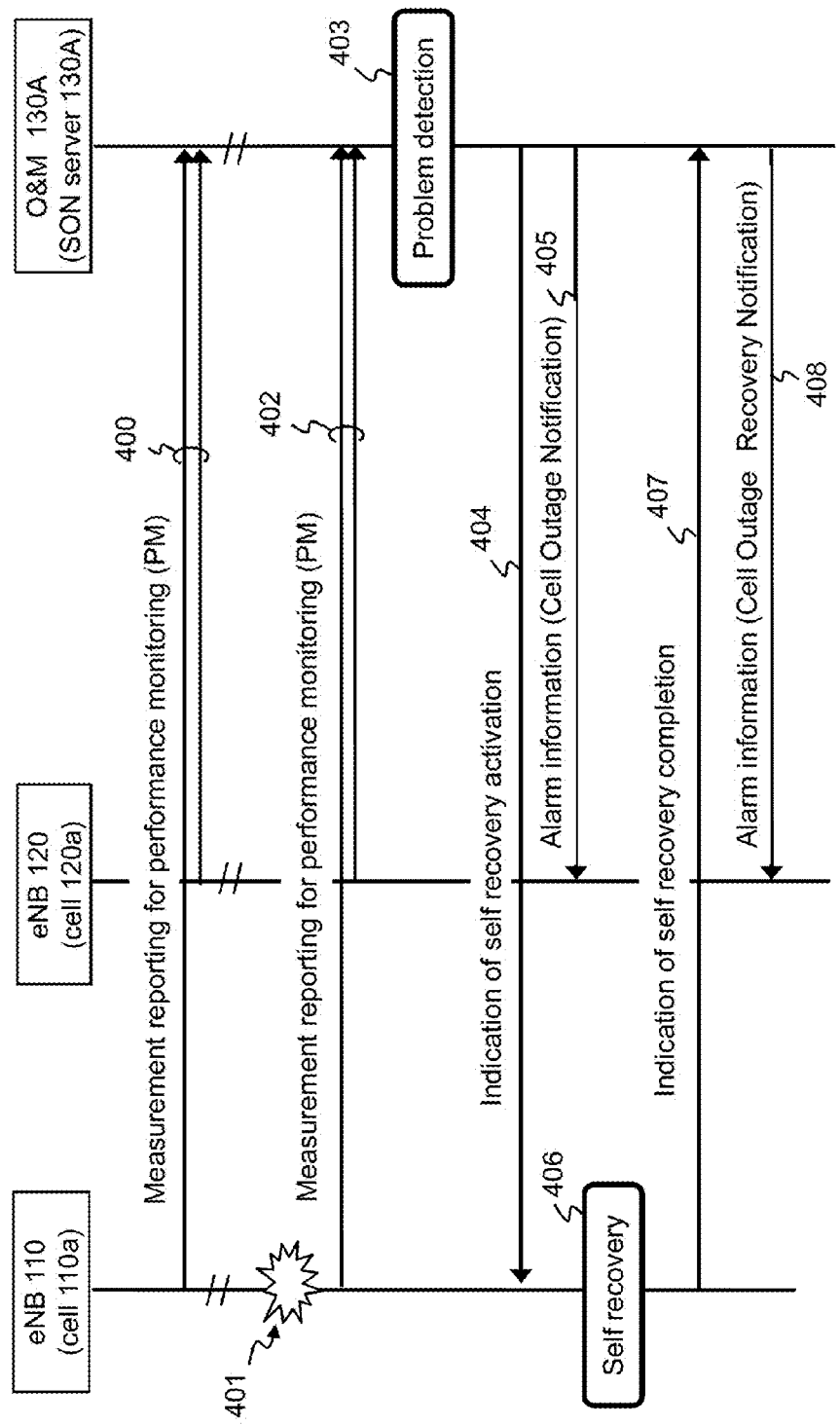

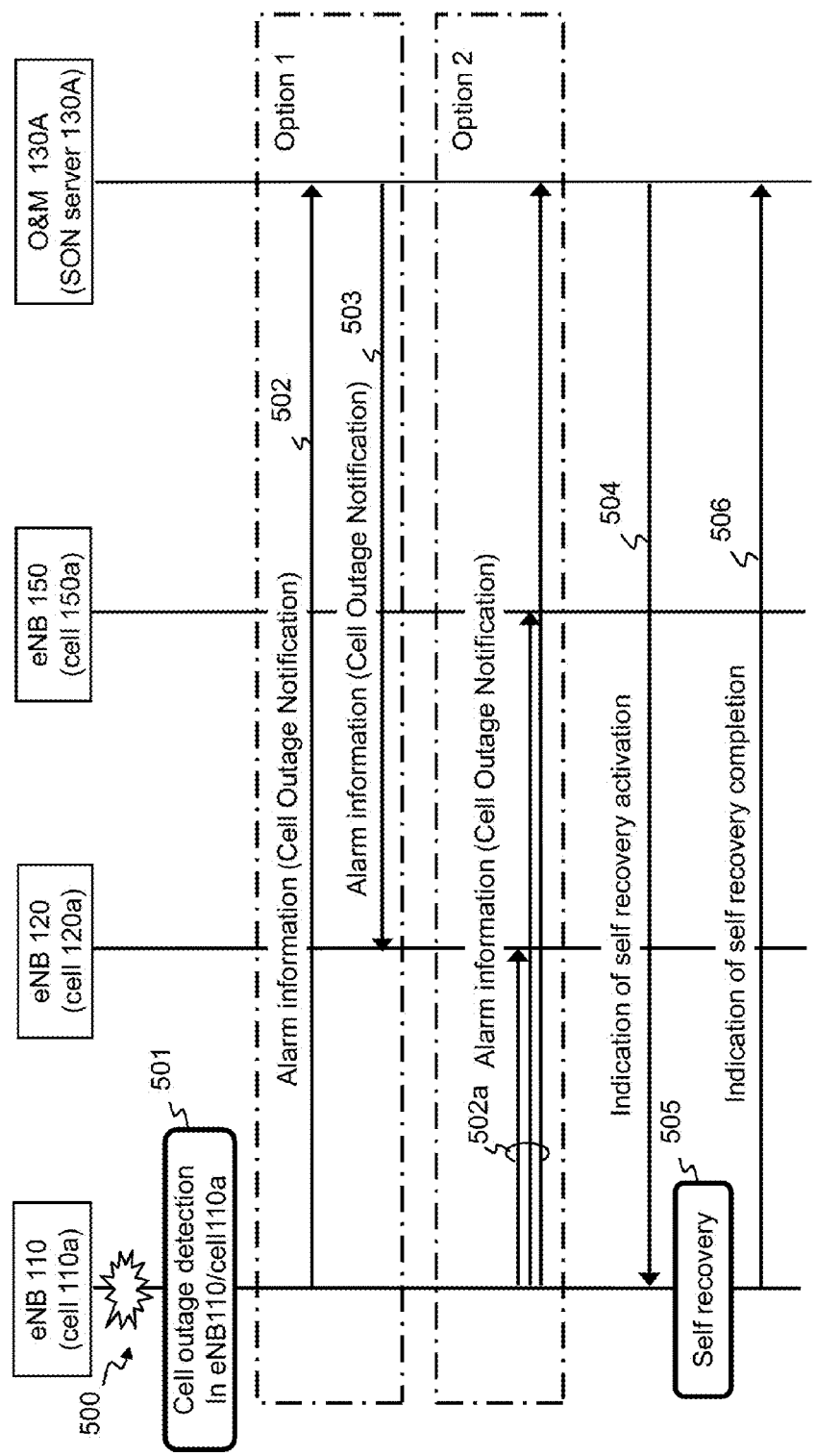

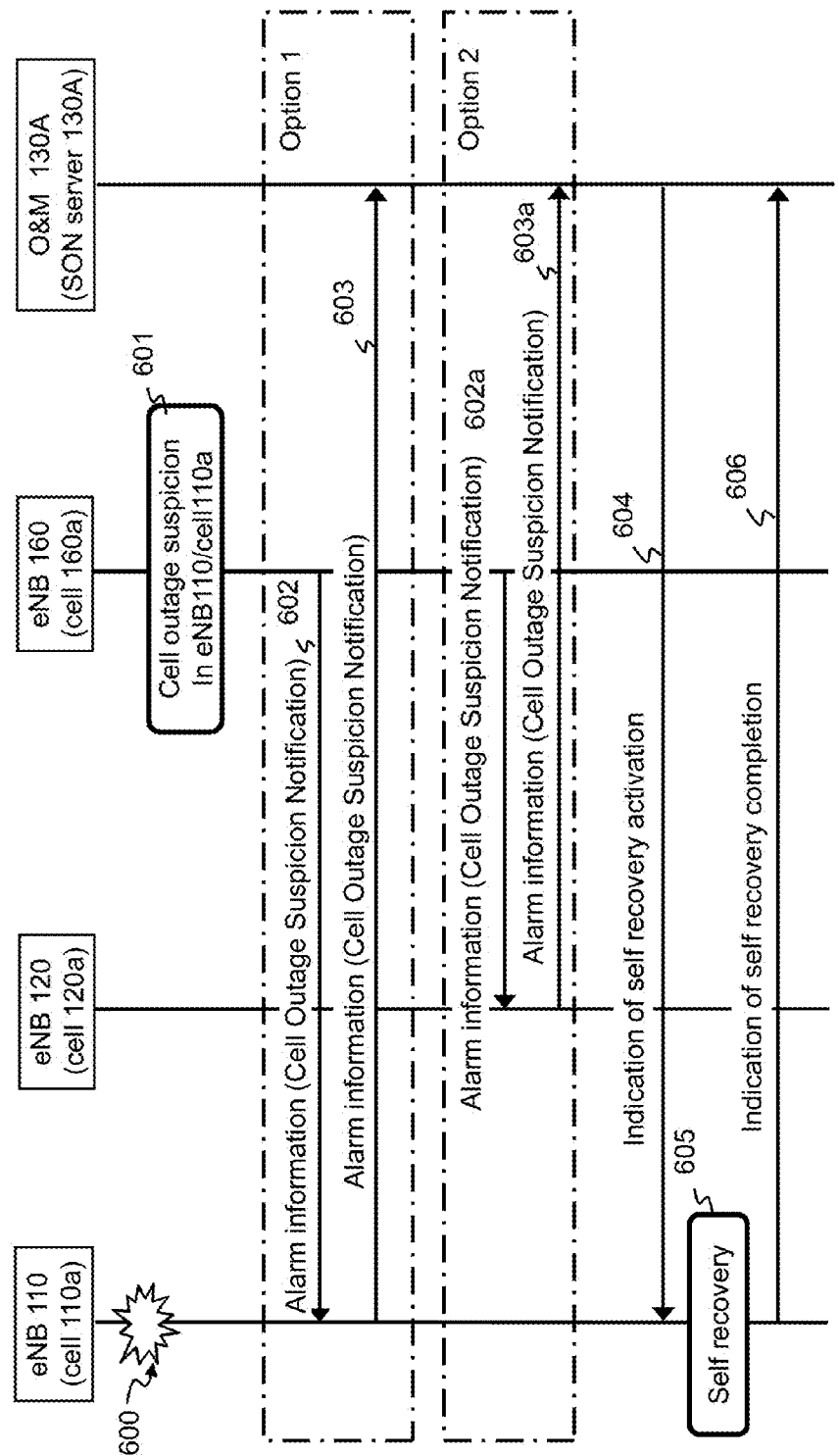

RADIO COMMUNICATION SYSTEM, RADIO STATION, NETWORK OPERATION MANAGEMENT APPARATUS, AND NETWORK HEALING METHOD

CROSS-REFERENCE TO RELATED PATENT APPLICATIONS

This application is a divisional of U.S. application Ser. No. 14/385,425, filed on Sep. 15, 2014, which is a National Stage Entry of International Application No. PCT/JP2013/001759, filed Mar. 15, 2013, which claims priority from Japanese Patent Application No. 2012-058625, filed Mar. 15, 2012. The entire contents of the above-referenced applications are expressly incorporated herein by reference.

TECHNICAL FIELD

The present invention relates to a radio communication system and, more particularly, to a radio station, a network operation management apparatus and a radio communication system that have a function of performing network optimization, as well as to a network healing method.

BACKGROUND ART

In recent years, active discussions have been conducted about SON (Self Organizing Network), which autonomously optimizes a radio parameter and/or network configuration in a radio communication system such as a cellular system, in the light of operation cost (OPEX) reduction. The standardization of SON functions is also under way in 3GPP LTE (Long Term Evolution) (NPL 1).

SON has functions such as the following:
Self-Configuration;
Self-Optimization; and
Self-Healing.
These are technologies for achieving respective different purposes. Of these functions, the self-healing function is a function such that a radio base station or a network operation management apparatus autonomously performs fault management, and an object thereof is, for example, to detect a problem such as a fault with a network apparatus and autonomously heal the fault (NPL 2).

Hereinafter, the self-healing function will be described briefly by taking a 3GPP LTE radio communication system as an example. Note that a radio base station (enhanced Node B) will be abbreviated to eNB.

Referring to FIG. 1, it is assumed that eNBs 1 and 2 manage cells 1 and 2, respectively, and that a network operation management apparatus (Operation and Management (OAM); hereinafter referred to as an O&M) manages these eNBs 1 and 2. In the case where an O&M has a SON function, it is also referred to as a SON server. Note that for the details of problem detection and self recovery in the self-healing function, the method according to NPL 2 is assumed to be used, and detailed descriptions thereof will be omitted.

As shown in FIG. 1, it is assumed that for network performance monitoring, the eNBs 1 and 2 periodically report a result of measuring service quality or information regarding service quality related to network performance, as network measurement information, to the O&M (Measurement reporting for Performance Monitoring (PM)). Based on this report, the O&M (SON server) monitors whether or not there is a problem with network apparatuses such as the eNBs 1 and 2. It is assumed that a fault occurs in the eNB 1, for example, with a radio transceiver section (Radio Frequency (RF)) at a certain point of time (Occurrence of fault). In this case, the eNB 1 reports the then measurement information to the O&M. Based on this measurement information, the O&M detects that some problem has occurred at the eNB 1 (Problem detection). For example, the O&M detects a failure by recognizing that the value of service quality indicated by this measurement information has suddenly degraded (the details thereof will be omitted). The O&M issues to the eNB 1 an instruction for self recovery such as, for example, reboot (Indication of self recovery activation). In accordance with this instruction, the eNB 1 executes self recovery such as reboot (Self recovery). Then, when completing the self recovery, the eNB 1 sends a completion notification to the O&M (Indication of self recovery completion).

In this manner, when a problem occurs at an eNB or a network apparatus, the O&M (SON server) detects the problem and issues an instruction for self recovery to the target eNB or network apparatus. In accordance with this instruction for self recovery, this eNB or network apparatus executes self recovery, whereby self-healing in a radio network system can be accomplished. Note that it is also conceivable that the above-described self-healing function is, in some cases, provided to a radio base station or network apparatus itself, instead to being provided to a network operation management apparatus.

CITATION LIST

Patent Literature

[NPL 1]
3GPP TS 36.300 v10.5.0, Section 22 (Internet: <URL> http:www.3gpp.org/ftp/Specs/html-info/36300.htm)
[NPL 2]
3GPP TS 32.541 v10.0.0 (Internet: <URL> http: www.3gpp.org/ftp/Specs/html-info/32541.htm)

SUMMARY OF INVENTION

Technical Problem

As described above, the self-healing function is achieved by sending and receiving a signal or message between a radio base station or network apparatus in which a failure has occurred and a network operation management apparatus (or SON server). Accordingly, the self-healing function is activated and completed only through control between a radio station and a network operation management apparatus that are involved in a failure, and no consideration is given to what effects are caused on a radio base station and a cell neighbouring the radio base station in which a failure has occurred. This is particularly problematic in a multi-vendor environment.

A multi-vendor environment is an environment in which radio base stations, network apparatuses, and network operation management apparatuses are not provided by a single vendor but are provided by multiple different vendors. Accordingly, in a multi-vendor environment, there are some cases where the vendor of a radio base station in which a failure occurs is different from the vendor of a neighbour radio base station, and so the neighbour radio base station cannot recognize this failure. For example, when a cell of a radio base station in which a failure has occurred has shrunk, it is difficult (or impossible) for a neighbour radio base station to correctly detect such shrink. If the neighbour radio base station continues normal operation while failing to recognize the cell shrink, there is a possibility that part or the entire area originally covered by the cell of the radio base station in which a failure has occurred may turn to an out-of-service area (also referred to as a dead spot). Increases of such an out-of-service area lead to a decrease in system capacity, greatly degrading a performance of the entire system. Considering the fact that multi-vendor environments are common in actual operation, the situation where a radio base station neighbouring a radio base station in which a failure has occurred cannot recognize an effect of this failure is a critical problem to be solved.

Moreover, the self-healing function is not necessarily provided to all network operation management apparatuses (or radio base stations or network apparatuses). In addition, even if it is provided, not all problems can be solved. For example, if a functional section for detecting a problem itself has a fault, it is impossible to even detect a problem. Accordingly, a function that assists self-healing instead of (or in addition to) the self-healing function is required. It is thought that this self-healing assistant function also needs to be implemented in multi-vendor environments as described above.

Accordingly, an object of the present invention is to provide a radio communication system, a radio station, a network operation management apparatus, and a network healing method that can suppress system performance degradation caused when a failure occurs in a radio base station, a network apparatus or the like.

Solution to Problem

A radio communication system according to the present invention is a radio communication system which includes multiple radio stations and a network operation management apparatus managing the radio stations and in which network optimization is performed, characterized in that at least one of a first radio station in which a failure occurs, a second radio station different from the first radio station, and the network operation management apparatus sends alarm information regarding the failure.

A network operation management apparatus according to the present invention is a network operation management apparatus in a radio communication system which includes multiple radio stations and in which network optimization is performed, characterized by comprising: a communication means for communicating alarm information regarding a failure with at least one of a first ration station in which the failure occurs, a second radio station different from the first radio station, and another network operation management apparatus.

A radio station according to the present invention is a radio station in a radio communication system which includes multiple radio stations and a network operation management apparatus managing the radio stations and in which network optimization is performed, characterized by comprising: a failure detection means for detecting occurrence of a failure in its own radio station or a first radio station different from its own radio station, or suspicion of such a failure; and a communication means for sending alarm information regarding the failure.

Moreover, a radio station according to the present invention is a radio station in a radio communication system which includes multiple radio stations and a network operation management apparatus managing the radio stations and in which network optimization is performed, characterized by comprising: a communication means for receiving alarm information regarding a failure in its own radio station or a first radio station different from its own radio station.

A network healing method according to the present invention is a network healing method in a radio communication system which includes multiple radio stations and a network operation management apparatus managing the radio stations and in which network optimization is performed, characterized in that at least one of a first radio station in which a failure occurs, a second radio station different from the first radio station, and the network operation management apparatus sends alarm information regarding the failure.

Advantageous Effects of Invention

According to the present invention, it is possible to suppress system performance degradation caused when a failure occurs in a radio base station, a network apparatus or the like.

BRIEF DESCRIPTION OF DRAWINGS

FIG. 11 is a system architecture diagram for describing operations in a radio communication system according to a first example of the present invention.

FIG. 12 is a system architecture diagram for describing operations in a radio communication system according to a second example of the present invention.

FIG. 13 is a system architecture diagram for describing operations in a radio communication system according to a third example of the present invention.

DESCRIPTION OF EMBODIMENTS

1. Outline of Exemplary Embodiments

Figure 1:
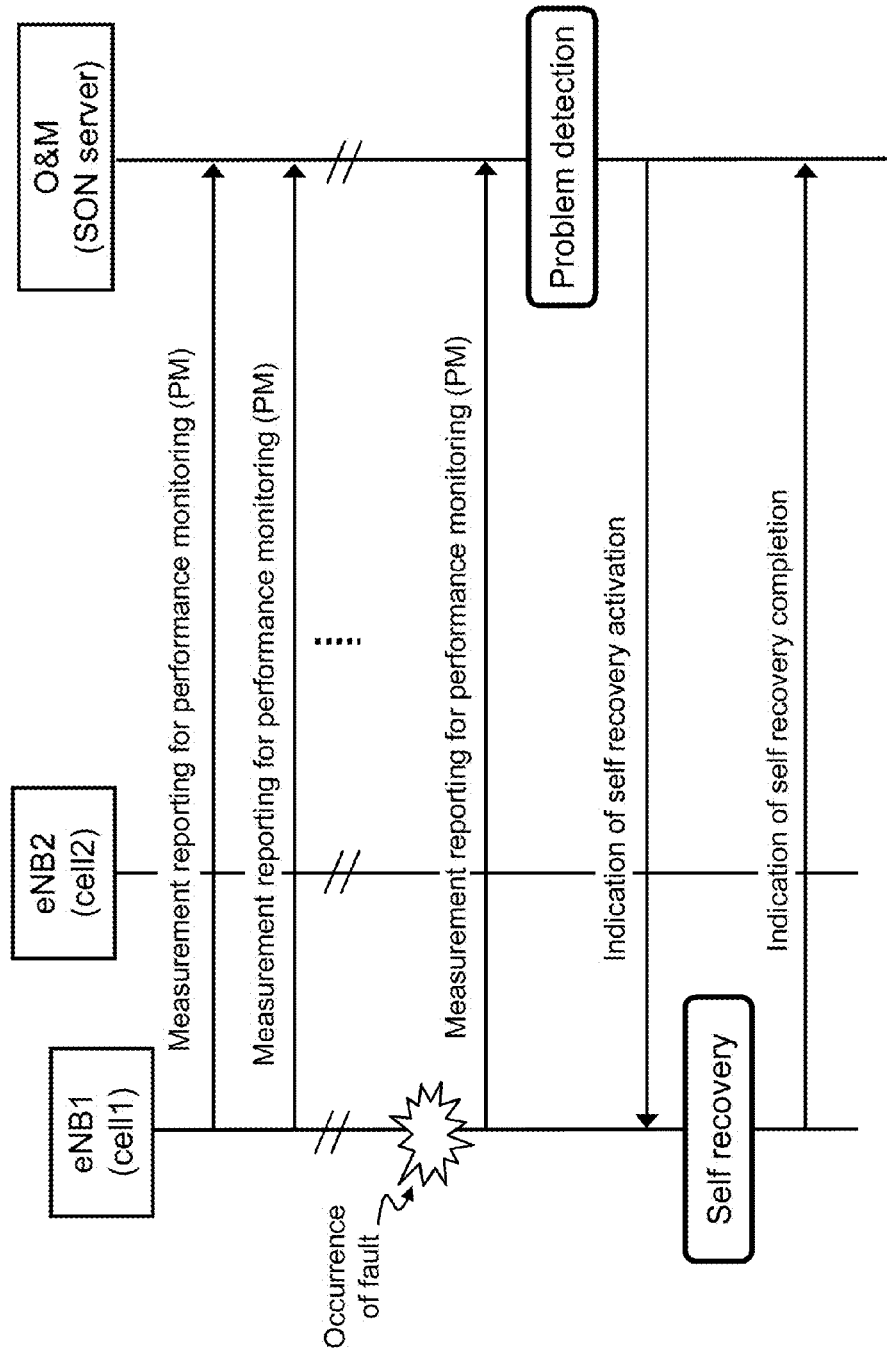
FIG. 1 is a sequence diagram showing an example of self-recovery activation operation in an existing radio communication system.

According to exemplary embodiments of the present invention, in a radio communication system which includes multiple radio stations managed by a network operation management apparatus and in which network optimization is autonomously performed, alarm information regarding a failure in a radio station is transmitted from at least one of this radio station, a radio station neighbouring thereon, and the network operation management apparatus. A radio station, by receiving such alarm information, can perform appropriate control according to the alarm information, whereby it is possible to suppress performance degradation in the entire system. Specifically, alarm information regarding a failure in a first radio station is transmitted and received between any two parties of the first radio station, a second radio station neighbouring the first radio station, and the network operation management apparatus. Then, the radio station or network operation management apparatus that has received the alarm information performs network operation, or alternatively the first radio station performs a self-recovery operation (e.g., device reboot) predefined as a countermeasure against this failure, or instructs the first radio station to perform a self-recovery operation. Hereinafter, among terms used in the present exemplary embodiments, a "failure" and "alarm information" will be described.

1.1) "Failure"

A "failure" refers to a situation in which an internal apparatus or a cell of a radio station does not function at a required level. Specifically, failures include, but are not limited to, a fault with an internal device of a radio station, a fault with a transceiver of a radio station, and a trouble in a cell managed by a radio station such as coverage shrink or disappearance. A "failure" is a concept including an abnormal state and an abnormal situation, that is, abnormalities in general.

1.2) "Alarm Information"

"Alarm information" refers to information indicating that a failure as described above is detected. For example, conceivable alarm information includes:
a) cell outage information related to a coverage problem in a first cell of the first radio station;
b) radio failure information related to a failure in radio signal control by the first radio station;
c) inter-cell interference information related to interference between a first cell of the first radio station and a second cell of the second radio station; and the like.

Hereinafter, these types of alarm information will be described in order.

For a) "cell outage information", conceivable ones include, for example:
a1) information indicating the occurrence of a coverage problem;
a2) information indicating the potential (possibility) of a coverage problem;
a3) information for requesting to check the presence or absence of a coverage problem;
a4) information for suspecting a coverage problem;
a5) information indicating that a coverage problem has been resolved; and the like.

For a method for using a1) "information indicating the occurrence of a coverage problem", for example, the first radio station sends this information to the second radio station or network operation management apparatus, and the second radio station performs optimization for its own second cell with consideration given to this information, or the network operation management apparatus instructs the first radio station to execute a self-recovery operation (e.g., device reboot). Alternatively, the network operation management apparatus sends this information to the first or second radio station, and the second radio station performs optimization for the second cell, or the first radio station executes a self-recovery operation.

Methods for using a2) "information indicating the potential of a coverage problem" may be basically similar to those of the information indicating the occurrence of a coverage problem. Alternatively, it is also possible that the second radio station performs optimization for the second cell, or the first radio station executes a self-recovery operation, only after the second radio station or network operation management apparatus receives the information indicating the potential of a coverage problem a predetermined number of times.

For a method for using a3) "information for requesting to check the presence or absence of a coverage problem", for example, the second radio station sends this information to the first radio station or network operation management apparatus, and the first radio station checks whether or not there is a problem with the coverage based on a measurement report from a radio terminal or statistical communication quality (KPI: Key Performance Indicator) in the first cell, or the network operation management apparatus checks whether or not there is a problem with the first cell based on a measurement report from the first radio station or a KPI (in the first cell) of the first radio station. Alternatively, the first radio station sends this information to the network operation management apparatus, and the network operation management apparatus checks whether or not there is an abnormality with the first radio station based on a measurement report from the first radio station or a KPI (in the first cell) of the first radio station. It is also conceivable that the network operation management apparatus instructs the first radio station to execute a self-recovery operation when the network operation management apparatus determines that there is (or may be) a problem with the coverage of the first cell, or that there is (or may be) an abnormality with the first radio station. Note that it can be assumed that the transmission by the second radio station of a request to check the presence or absence of a coverage problem with the first cell of the first radio station is trigged based on measurement information from a radio terminal in the second cell. For example, a conceivable trigger is a case where the received power or received quality of a signal from the first cell has decreased by a predetermined amount or more within a predetermined period of time in the second cell, or a case where the number or percentage of radio terminals that detect signals from the first cell is smaller than a predetermined number or percentage in the second cell, or the like.

Methods for using a4) "information for suspecting a coverage problem" may be basically similar to those of the information for requesting to check the presence or absence of a coverage problem. Alternatively, it is also possible that the first radio station or network operation management apparatus checks the presence or absence of a coverage problem only after the first radio station or network operation management apparatus receives the information for suspecting a coverage problem a predetermined number of times.

For a method for using a5) "information indicating that a coverage problem has been resolved", for example, the first radio station may send this information to the second radio station or network operation management apparatus after the first radio station executes a self-recovery operation and thereby solves an abnormality or after coverage optimization or the like is performed to thereby solve a coverage problem, or the network operation management apparatus may sends this information to the second radio station after it determines that a coverage problem with the first radio station has been resolved. Alternatively, it is also possible that when the first radio station or network operation management apparatus determines the absence of a problem in determination as to the presence or absence of a coverage problem with the first cell, this information is sent to second radio station or network operation management apparatus.

Further, the "cell outage information" may be configured to also include:
a6) identifier of a cell or radio station;
a7) location information of a radio station;
a8) information on processing scheduled to be executed on a side sending the cell outage information (execution information);
a9) information on processing requested to a side receiving the cell outage information (request information); or the like.

For a6) "identifier of a cell or radio station", a conceivable one is, for example, a cell identity (ID) or radio station ID.

For a7) "location information of a radio station", a conceivable one is, for example, location information acquired through a location information acquisition service such as GPS (Global Positioning System). Notification (or exchange) of the location information of a radio station makes it possible to consider which radio station is affected or is likely to be affected, and the like.

For a8) "execution information", which is information indicating processing scheduled to be performed (in a target cell) by a radio station or network operation management apparatus that sends this cell outage information, a conceivable one is information indicating that, for example, coverage optimization, an instruction to execute coverage optimization, a self-recovery operation (e.g., reboot) or the like will be performed.

For a9) "request information", which is information indicating processing that a radio station or network operation management apparatus to which this cell outage information is sent is requested (or asked or expected) to perform, a conceivable one is information indicating that, for example, coverage optimization, a self-recovery operation or the like is requested (or asked or expected) to be performed.

For b) "radio failure information", conceivable ones include, for example:
b1) information indicating a fault with a radio signal transceiver (radio frequency (RF) section);
b2) information indicating suspicion of a fault with a radio signal transceiver (RF section);
b3) information indicating a fault with a radio signal transmission section;
b4) information indicating a fault with a radio signal reception section; and the like.

For a method for using b1) "information indicating a fault with a radio signal transceiver (RF section)", for example, the first radio station notifies the second radio station or network operation management apparatus that a fault with the RF section of its own station is detected, or the network operation management apparatus notifies the first radio station and/or the second radio station that a fault with the RF section of the first radio station is detected. When the second radio station receives such notification, the second radio station performs processing for extending the coverage of the second cell so as to cover the coverage of the first cell of the first radio station before the RF section fails, processing for deleting the first cell from a neighbour cell list, or the like. When the network operation management apparatus receives such notification, the network operation management apparatus performs processing for instructing the first radio station to perform a self-recovery operation (e.g. device reboot), processing for raising a system alarm, or the like.

Methods for using b2) "information indicating suspicion of a fault with a radio signal transceiver (RF section)" may be similar to those of the information indicating a fault with a radio signal RF section. Alternatively, it is also possible that only after the information indicating suspicion of a fault with an RF section is notified a predetermined number of times, the second radio station extends the coverage by increasing the transmit power of a pilot signal (also referred to as a reference signal) or by decreasing the antenna tilt angle (i.e., uptilting), or the network operation management apparatus performs processing for instructing the first radio station to execute a self-recovery operation, processing for raising a system alarm, or the like.

Methods for using b3) "information indicating a fault with a radio signal transmission section" and for using b4) "information indicating a fault with a reception section" are similar to those of the information indicating a fault with a radio signal RF section.

For c) "inter-cell interference information", conceivable ones include, for example:
information indicating the degree of interference between the first and second cells;
information indicating the interference of a signal of the second cell in the first cell (first interference information);
information indicating the interference of a signal of the first cell in the second cell (second interference information); and the like.

The "information indicating the degree of interference between the first and second cells" is information indicating, for example, the difference or ratio between the received power or received quality of a signal from the second cell (e.g., a known downlink signal) in the first cell and the received power or received quality of a signal from the first cell in the second cell, or the like.

For a method for using the "information indicating the degree of interference" or "first interference information", for example, the first radio station notifies this information to the second radio station and/or network operation management apparatus that manages the second cell from which the first ration station is suffering a predetermined value or higher of interference, or the first radio station notifies this information to the second radio station and/or network operation management apparatus when the interference of a signal from the second cell has changed by a predetermined amount or larger. Alternatively, this information may be notified concurrently with notification of cell outage information or radio failure information. The second radio station or network operation management apparatus that has received this information performs, for example, coverage optimization or mobility optimization (e.g., adjustment of a handover parameter) for the second cell or the first cell.

For a method for using the "information indicating the degree of interference" and "second interference information", for example, the second radio station notifies this information to the first radio station or network operation management apparatus when the second radio station suffers, in the second cell, a predetermined value or higher of interference from a signal of the first cell, or when the interference of a signal from the first cell has changed by a predetermined amount or larger. The first radio station or network operation management apparatus that has received this information performs coverage optimization or mobility optimization for the first cell.

Notification of the alarm information as illustrated above among the first radio station, second radio station, and network operation management apparatus as appropriate makes it possible that, when a failure occurs in (the first cell of) the first radio station, an effect on (the second cell of) the neighbour second station is reduced, or the detection of the failure in (the first cell of) the first radio station is assisted so that the detection of, or recovery from, such an abnormality can be quickly performed. Note that if the first and second radio stations are managed by (connected to) different network operation management apparatuses, respectively, a configuration may be made such that the above-described information is communicated between these network operation management apparatuses.

To take an example for the above-described cell shrink, when a cell of a radio station has been shrunk due to a failure, a neighbour radio station can find the cell shrink from alarm information, according to the present exemplary embodiment. Accordingly, the neighbour radio station can control a cell of its own station so as to cover part or the entire area originally covered by the cell of the radio station in which a failure has occurred, whereby it is possible to avoid the creation of a dead spot. With other alarm information as well, a neighbour radio station similarly performs appropriate cell control, whereby it is possible to suppress performance degradation in the entire system caused by a failure in a radio station.

Note that conceivable major communication patterns of alarm information include the following:
1) The first radio station generates alarm information and sends it to the second radio station or network operation management apparatus;
2) The network operation management apparatus generates alarm information and sends it to any of the first radio station, the second radio station, and another network operation management apparatus;
3) The second radio station generates alarm information and sends it to the first radio station, another second radio station (which can be thought to be a third radio station), or the network operation management apparatus; and the like.

However, the present invention is also applicable to other patterns.

2. System Architecture

Figure 2:
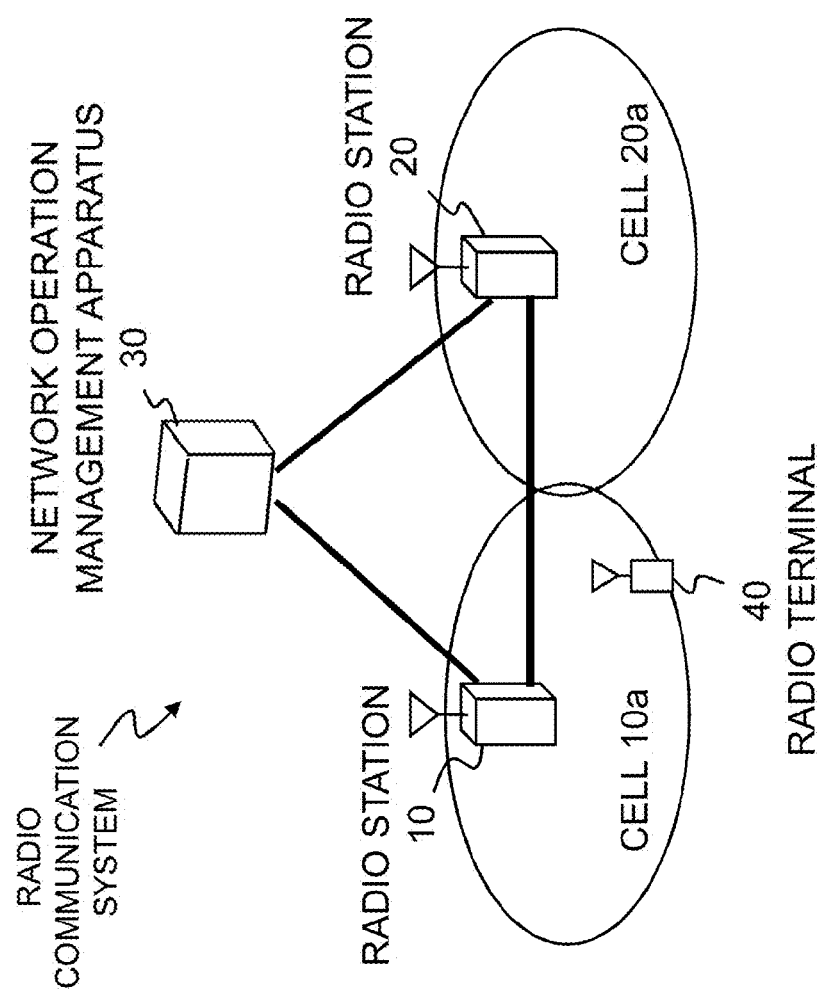
FIG. 2 is a system architecture diagram for describing an outline of a radio communication system according to the present invention.

As shown in FIG. 2, it is assumed that a radio communication system to which exemplary embodiments of the present invention are applied includes radio stations 10 and 20, which manage cells 10a and 20a, respectively, and a network operation management apparatus 30, which controls or manages the radio stations 10 and 20. It is sufficient for the cells 10a and 20a to be deployed as closely as they exert effects on each other, and it is not necessary for them to be in contact with each other at the edges. A radio terminal 40 can wirelessly communicate with the radio station 10 and/or the radio station 20.

The radio stations in FIG. 2 include not only a radio base station directly controlling a cell, but may also include an upper level station controlling or managing multiple radio base stations (and hence multiples cells). It is conceivable that a radio station is, for example, a radio base station, a base station control station, or the like and that a network operation management apparatus 30 is a SON (Self Organizing Network) server, a core network apparatus, or the like. The radio stations 10 and 20 may be communicably connected to each other via an upper level network apparatus, but it is also possible that they are directly connected through a higher-speed interface. Here, "higher-speed" means that the interface may be a physically higher-speed circuit than other interfaces, or may produce shorter delay because of simple processing, shorter communication interval, or the like. A radio station notifies information related to network optimization through the interface between radio stations, resulting in increased effect of avoiding system performance degradation caused when a failure occurs, in comparison with notification via an upper level network apparatus. When a failure occurs, the longer time is taken to notify information, the further the performance degradation proceeds. Accordingly, a radio station notifies information through a high-speed interface between radio stations, whereby the greater effect of avoiding performance degradation can be obtained.

Hereinafter, a description will be given of the configurations of a radio station, a network operation management apparatus, and a radio terminal according to exemplary embodiments of the present invention. Note that first and second exemplary embodiments are discriminated from each other by adding "-1" and "-2", respectively, to the reference numerals of radio stations and a network operation management apparatus.

3. First Exemplary Embodiment

According to a first exemplary embodiment of the present invention, a network operation management apparatus 30-1 detects a failure in a radio station and notifies alarm information to a neighbour radio station. Hereinafter, the functional configurations of radio stations 10-1 and 20-1 and the network operation management apparatus 30-1 according to the present exemplary embodiment will be described with reference to FIG. 3.

3.1) Configuration

Figure 3:
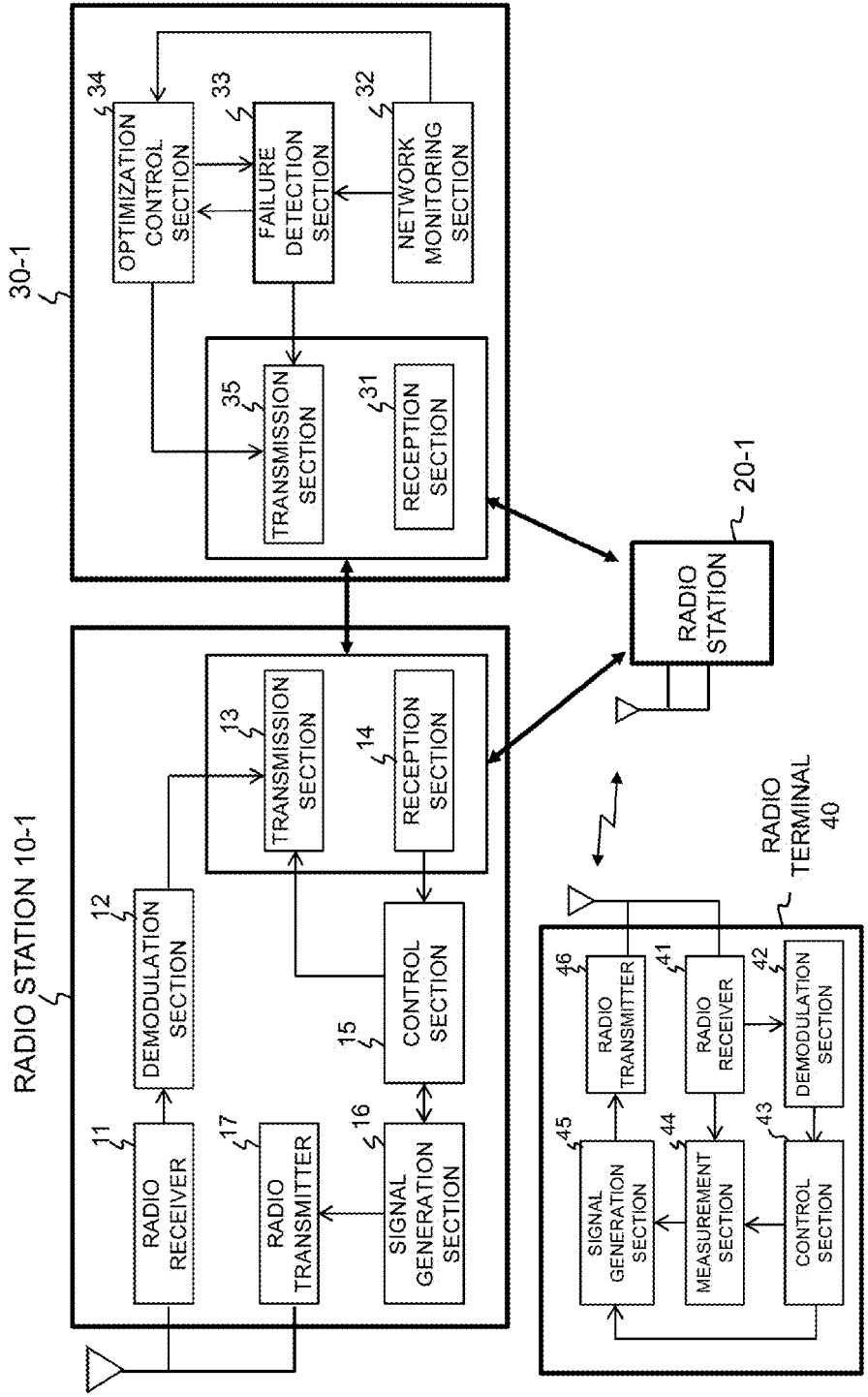
FIG. 3 is a block diagram showing functional configurations of a radio station and a network operation management apparatus in a radio communication system according to a first exemplary embodiment of the present invention.

Referring to FIG. 3, the radio station 10-1 includes: a radio receiver 11 that receives a radio signal from a radio terminal 40; a demodulation section 12 that demodulates a received signal; a transmission section 13 that transmits demodulated information or control information to an upper level network or another radio station; a reception section 14 that receives a signal from an upper level network or another radio station; a control section 15 that performs control based on a signal received from an upper level network; a signal generation section 16 that generates a transmission signal based on data or control information to transmit to the radio terminal 40; and a radio transmitter 17 that transmits a radio signal to the radio terminal 40. In addition, the control section 15 can perform self cell control in accordance with alarm information received from the network operation management apparatus 30-1 or another radio station. Moreover, the control section 15 is assumed to have a function of monitoring the performance of its own station and periodically reporting a result of the monitoring (e.g., network measurement information, which includes a result of measuring service quality at its own station and service quality related information) to the network operation management apparatus 30-1 via the transmission section 13, as described earlier. Note that the radio station 20 has basically the same functional configuration.

The network operation management apparatus 30-1 includes: a reception section 31 that receives a signal from a radio station or a upper level network; a network monitoring section 32 that stores information included in a received signal (e.g., network measurement information obtained by a radio station) and calculates statistical communication quality (KPI: Key Performance Indicator); a failure detection section 33 that detects the occurrence of a failure in a radio station based on the network measurement information or KPI information and controls transmission of alarm information; an optimization control section 34 that controls network optimization at a radio station or its upper level network; and a transmission section 35 that transmits a signal such as an instruction for optimization to a radio station or a upper level network.

Note that the radio terminal 40 includes: a radio receiver 41 that receives a radio signal from a radio station (e.g., a radio base station); a demodulation section 42 that demodulates the radio signal; a control section 43 that performs control based on a result of demodulation; a measurement section 44 that measures a received signal; a signal generation section 45 that generates a signal from data or control information; and a radio transmitter 46 that transmits a signal to a radio station.

3.2) Operation

Figure 4:
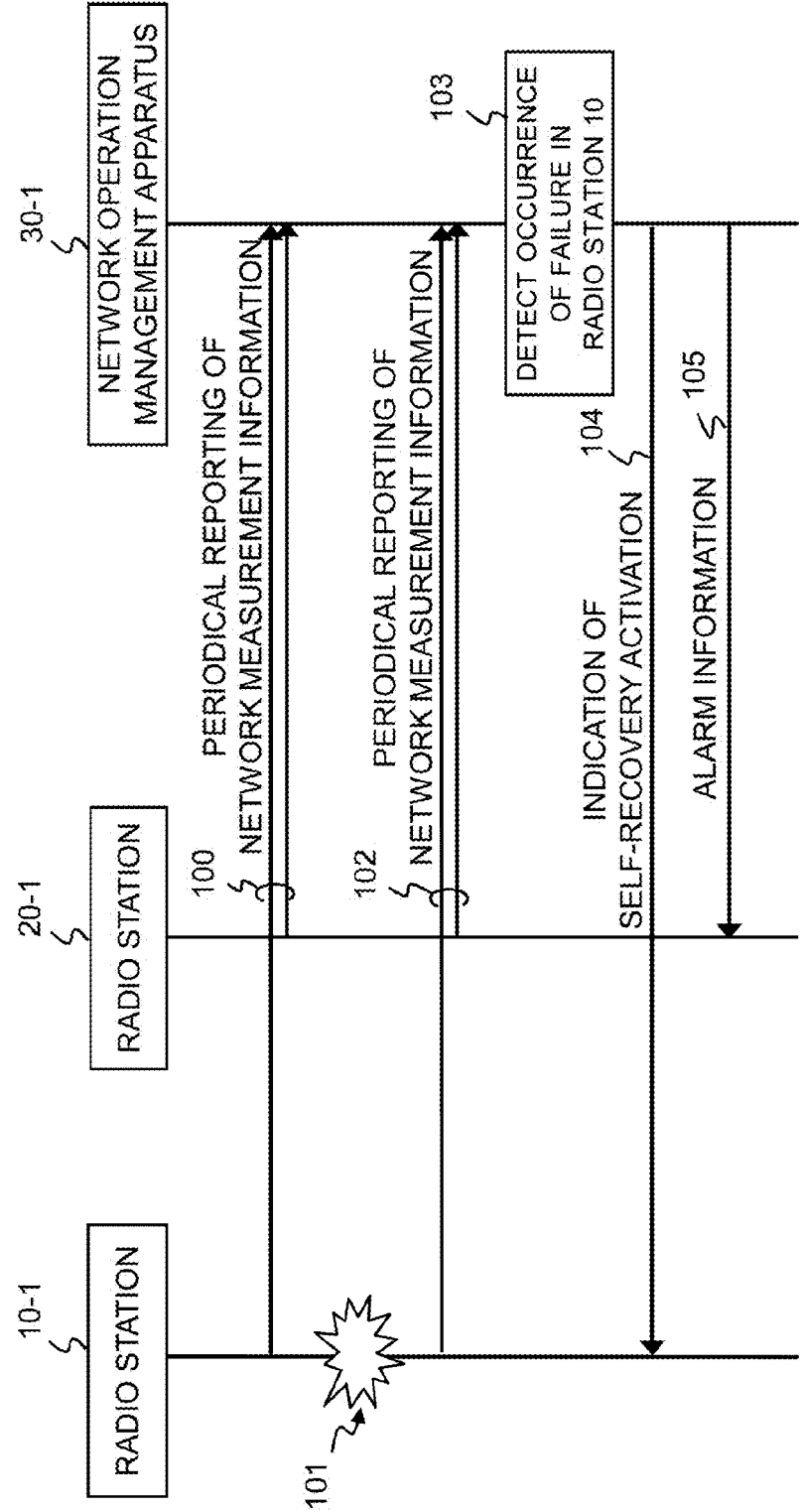
FIG. 4 is a sequence diagram showing an example of operations in the radio communication system according to the first exemplary embodiment of the present invention.

Referring to FIG. 4, the control section 15 of each of the radio stations 10-1 and 20-1 periodically reports network measurement information including a result of measurement of service quality at its own station and/or service quality related information to the network operation management apparatus 30-1 via the transmission section 13 (Operation 100). When some sort of failure 101 occurs in the radio station 10-1 at a certain point of time, the control section 15 of the radio station 10-1 reports, at normal intervals, network measurement information reflecting this failure to the network operation management apparatus 30-1 (Operation 102).

The failure detection section 33 of the network operation management apparatus 30-1, when receiving network measurement information from each radio station via the reception section 31, detects the failure in the radio station 10-1 from the received network measurement information (Operation 103). When the failure detection section 33 detects the failure in the radio station 10-1, the optimization control section 34 sends an instruction for self-recovery activation to the radio station 10-1 from the transmission section 35 (Operation 104), while the failure detection section 33 sends alarm information to the radio station 20-1 neighbouring the radio station 10-1 (Operation 105).

4. Second Exemplary Embodiment

According to a second exemplary embodiment of the present invention, a radio station detects a failure in itself or another station and notifies alarm information to a radio station neighbouring the radio station in which the failure has occurred. Hereinafter, the functional configurations of radio stations 10-2 and 20-2 and a network operation management apparatus 30-2 will be described with reference to FIG. 5.

4.1) Configuration

Figure 5:
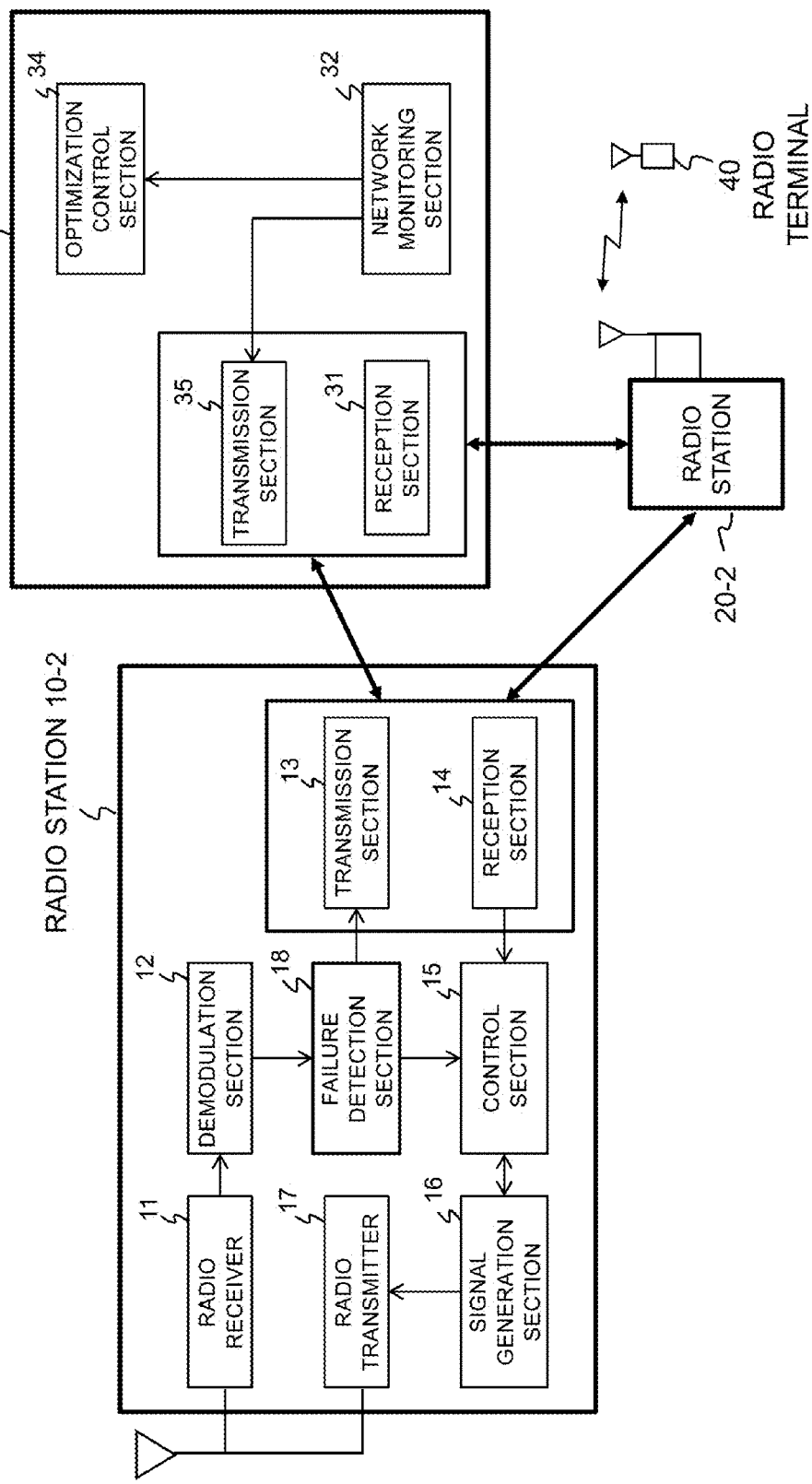
FIG. 5 is a block diagram showing functional configurations of a radio station and a network operation management apparatus in a radio communication system according to a second exemplary embodiment of the present invention.

Referring to FIG. 5, the radio station 10-2 has basically the same configuration as the radio station 10-1 according to the first exemplary embodiment shown in FIG. 3, except that the radio station 10-2 is provided with a failure detection section 18 that detects the occurrence of a failure based on a result of demodulation of a signal from a radio terminal 40 or statistical communication quality (KPI), and therefore a description thereof will be omitted with the same reference signs being assigned. Moreover, the network operation management apparatus 30-2 has basically the same configuration as the network operation management apparatus 30-1 according to the first exemplary embodiment shown in FIG. 3, except that the failure detection section 33 is excluded, and therefore a description thereof will be omitted with the same reference signs being assigned.

4.2) Operation

Operation Example 1

Figure 6:
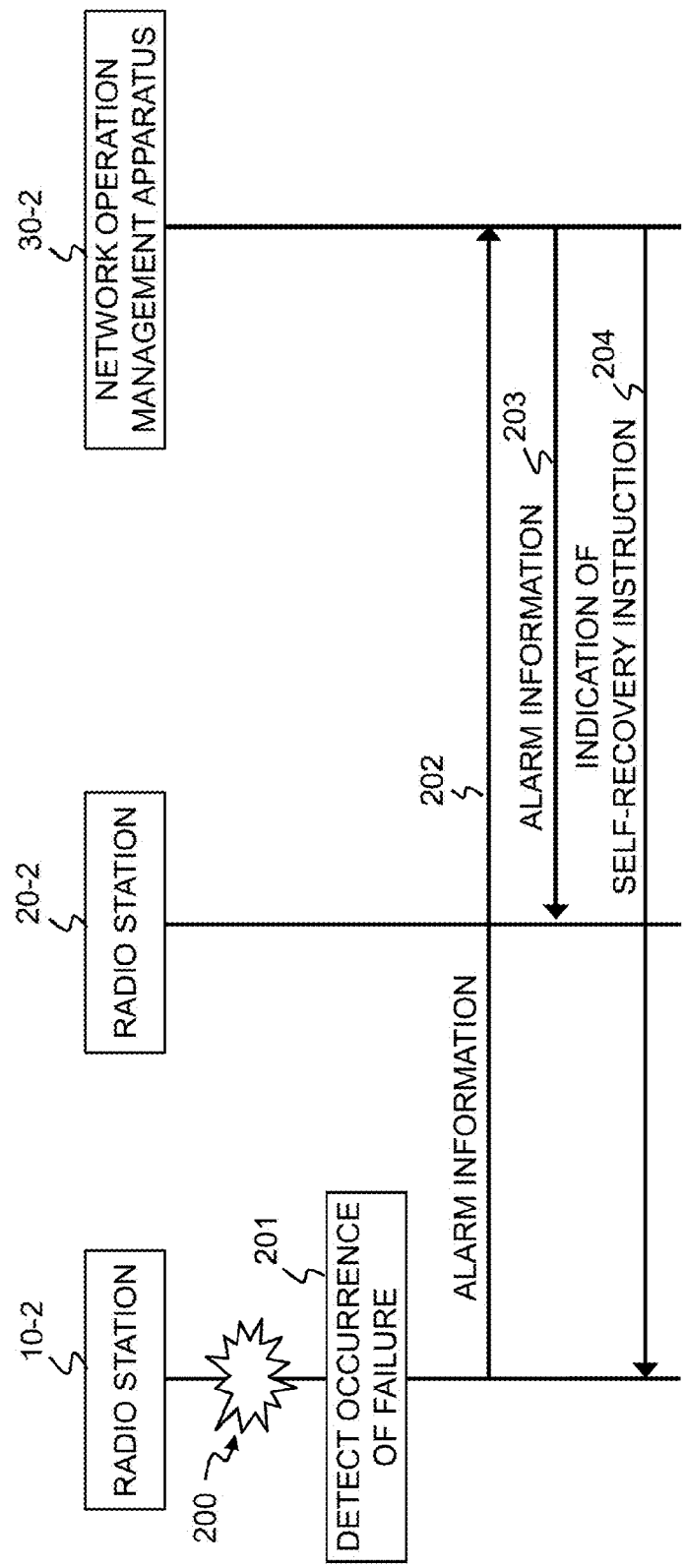
FIG. 6 is a sequence diagram showing a first example of operations in the radio communication system according to the second exemplary embodiment of the present invention.

Referring to FIG. 6, when some sort of failure 200 occurs in the radio station 10-2, the failure detection section 18 detects the occurrence of the failure based on a result of demodulation by the demodulation section 12 or statistical communication quality (KPI) (Operation 201), and generates and sends alarm information to the network operation management apparatus 30-2 from the transmission section 13 (Operation 202). The network monitoring section 32 of the network operation management apparatus 30-2 transfers the received alarm information to the radio station 20-2 neighbouring the radio station 10-2 (Operation 203), and the optimization control section 34 sends an instruction for self-recovery instruction (activation) to the radio station 10-2 from the transmission section 35 (Operation 204).

Operation Example 2

Figure 7:
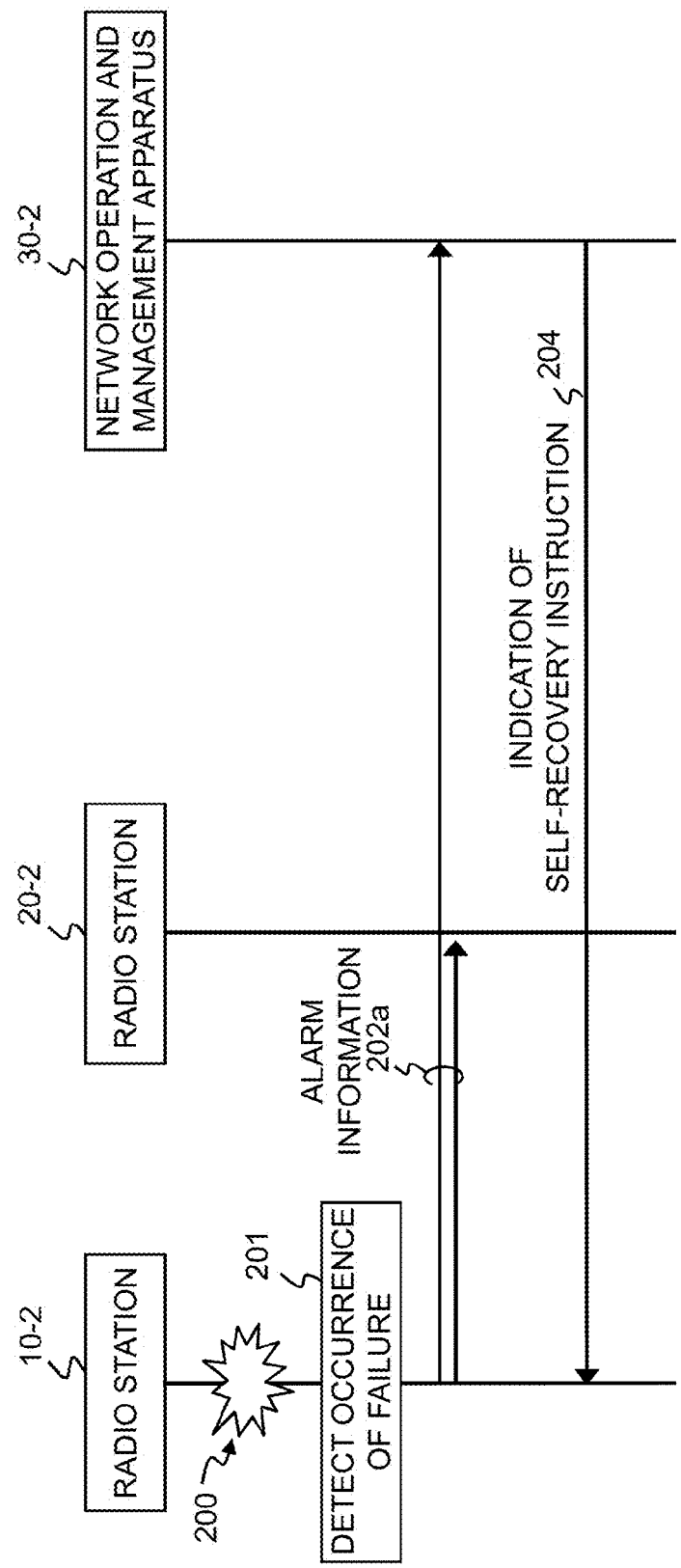
FIG. 7 is a sequence diagram showing a second example of operations in the radio communication system according to the second exemplary embodiment of the present invention.

Referring to FIG. 7, when some sort of failure 200 occurs in the radio station 10-2, the failure detection section 18 detects the occurrence of the failure based on a result of demodulation by the demodulation section 12 or statistical communication quality (KPI) (Operation 201), and generates and sends alarm information to the neighbour radio station 20-2 and the network operation management apparatus 30-2 from the transmission section 13 (Operation 202a). The optimization control section 34 of the network operation management apparatus 30-2, when receiving the alarm information, sends an instruction for self-recovery instruction (activation) to the radio station 10-2 from the transmission section 35 (Operation 204).

Operation Example 3

Figure 8:
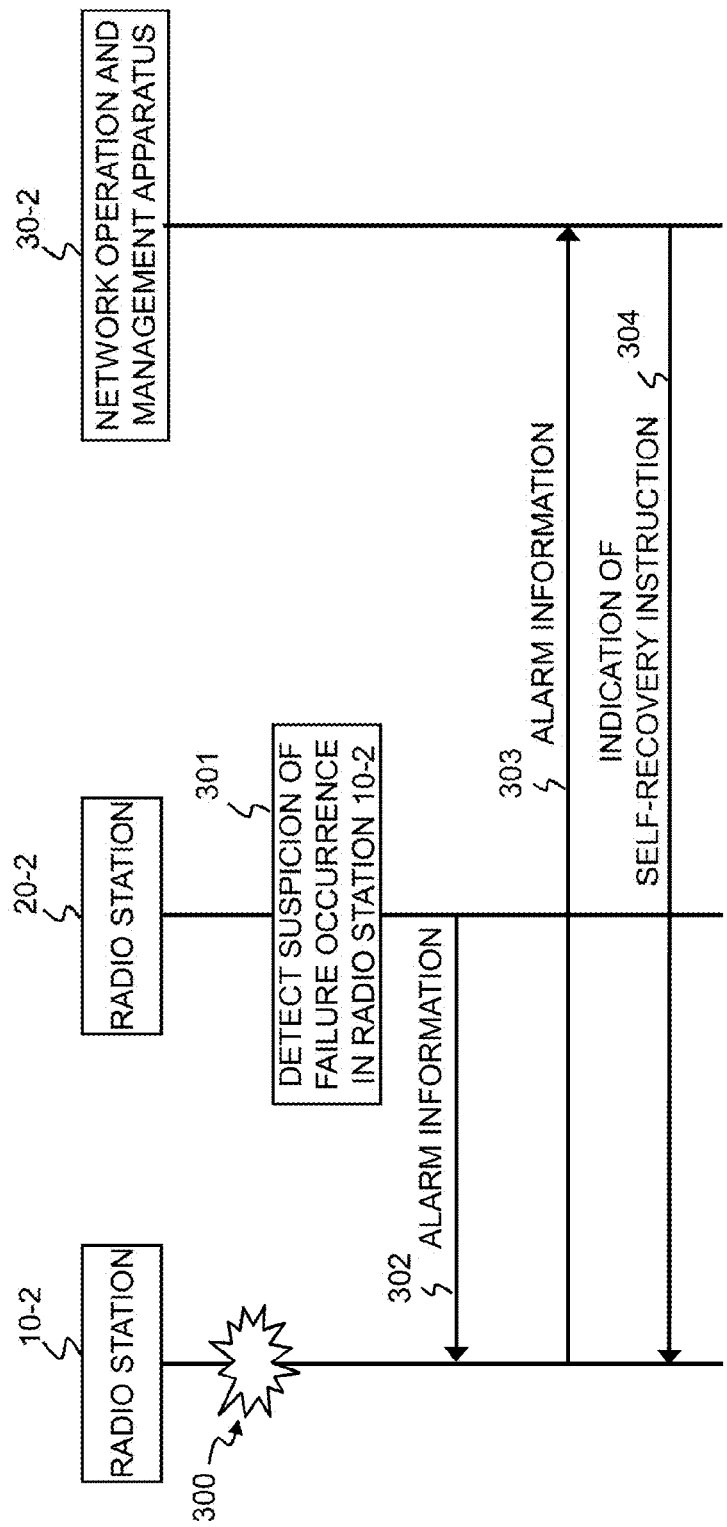
FIG. 8 is a sequence diagram showing a third example of operations in the radio communication system according to the second exemplary embodiment of the present invention.

Referring to FIG. 8, when some sort of failure 300 occurs in the radio station 10-2, the failure detection section 18 of the radio station 20-2 neighbouring this radio station 10-2 detects suspicion of failure occurrence in the base station 10-2 based on a result of demodulation by the demodulation section 12 or statistical communication quality (KPI) (Operation 301). The failure occurrence section 18 of the radio station 20-2 generates alarm information indicating suspicion of failure occurrence in the radio station 10-2 and sends it to the radio station 10-2 from the transmission section 13 (Operation 302). The radio station 10-2 that has received the alarm information sends this alarm information to the network operation management apparatus 30-2 (Operation 303). In response to this, the optimization control section 34 of the network operation management apparatus 30-2 sends an instruction for self-recovery instruction (activation) to the radio station 10-2 (Operation 304). Note that the alarm information may be information indicating "failure occurrence" instead of information indicating "suspicion of failure occurrence".

Operation Example 4

Figure 9:
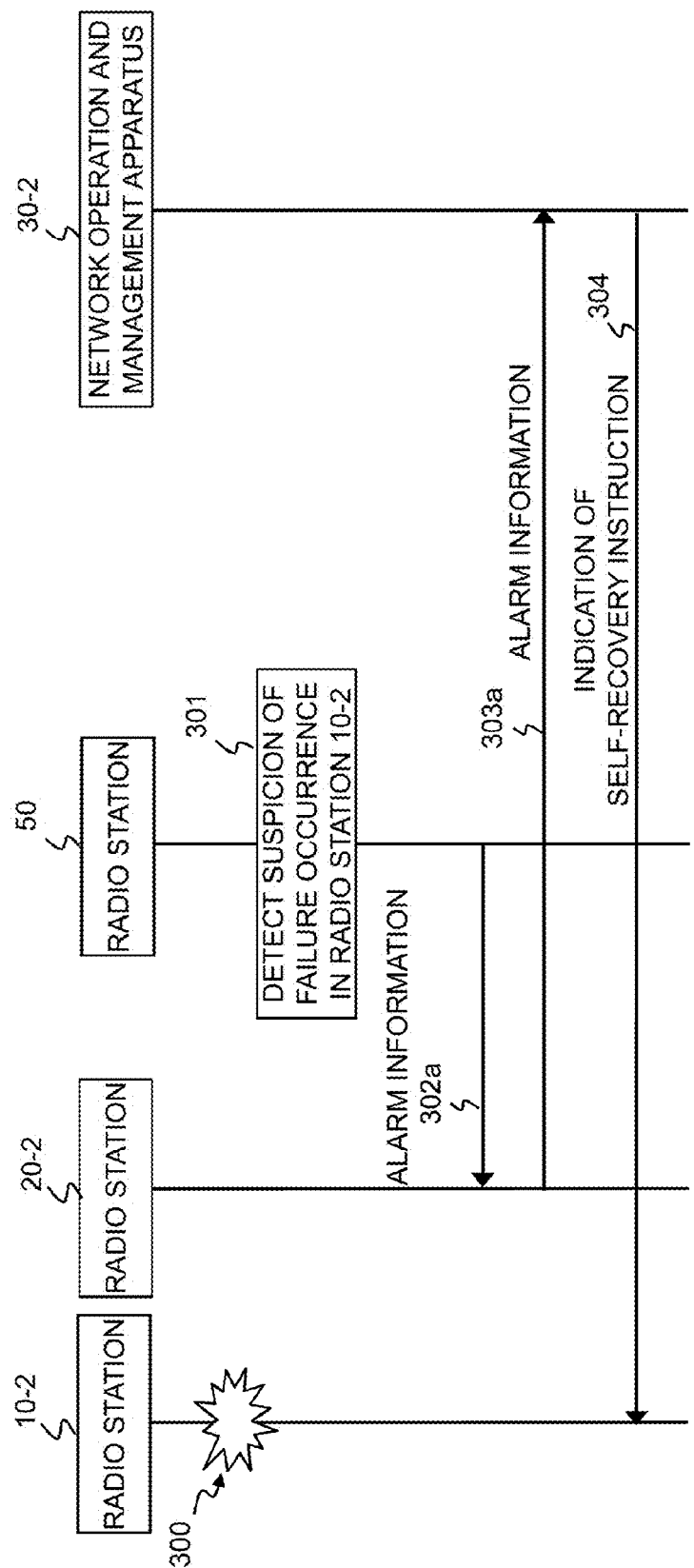
FIG. 9 is a sequence diagram showing a fourth example of operations in the radio communication system according to the second exemplary embodiment of the present invention.

Referring to FIG. 9, when some sort of failure 300 occurs in the radio station 10-2, and the failure detection section 18 of a radio station 50 detects suspicion of failure occurrence in the radio station 10-2 based on a result of demodulation by the demodulation section 12 or statistical communication quality (KPI) (Operation 301), then the failure occurrence section 18 of the radio station 50 generates alarm information indicating suspicion of failure occurrence in the radio station 10-2 and sends it to the radio station 20-2 neighbouring the radio station 10-2 from the transmission section 13 (Operation 302a). The radio station 20-2 that has received the alarm information sends this alarm information to the network operation management apparatus 30-2 (Operation 303a), and in response to this, the optimization control section 34 of the network operation management apparatus 30-2 sends an instruction for self-recovery instruction (activation) to the radio station 10-2 (Operation 304). Note that the alarm information may be information indicating "failure occurrence" instead of information indicating "suspicion of failure occurrence".

5. Effects

According to the above-described first and second exemplary embodiments, when a failure occurs in a radio station, its neighbour radio station receives alarm information and thereby can find the occurrence of the failure in the radio station adjacent thereto. Accordingly, the neighbour radio station can perform appropriate control according to the alarm information, whereby it is possible to suppress performance degradation in the entire system.

6. Application Examples

Hereinafter, a description will be given of examples in which the above-described exemplary embodiments are applied to a 3GPP LTE (Long Term Evolution) radio communication system.

Figure 10:
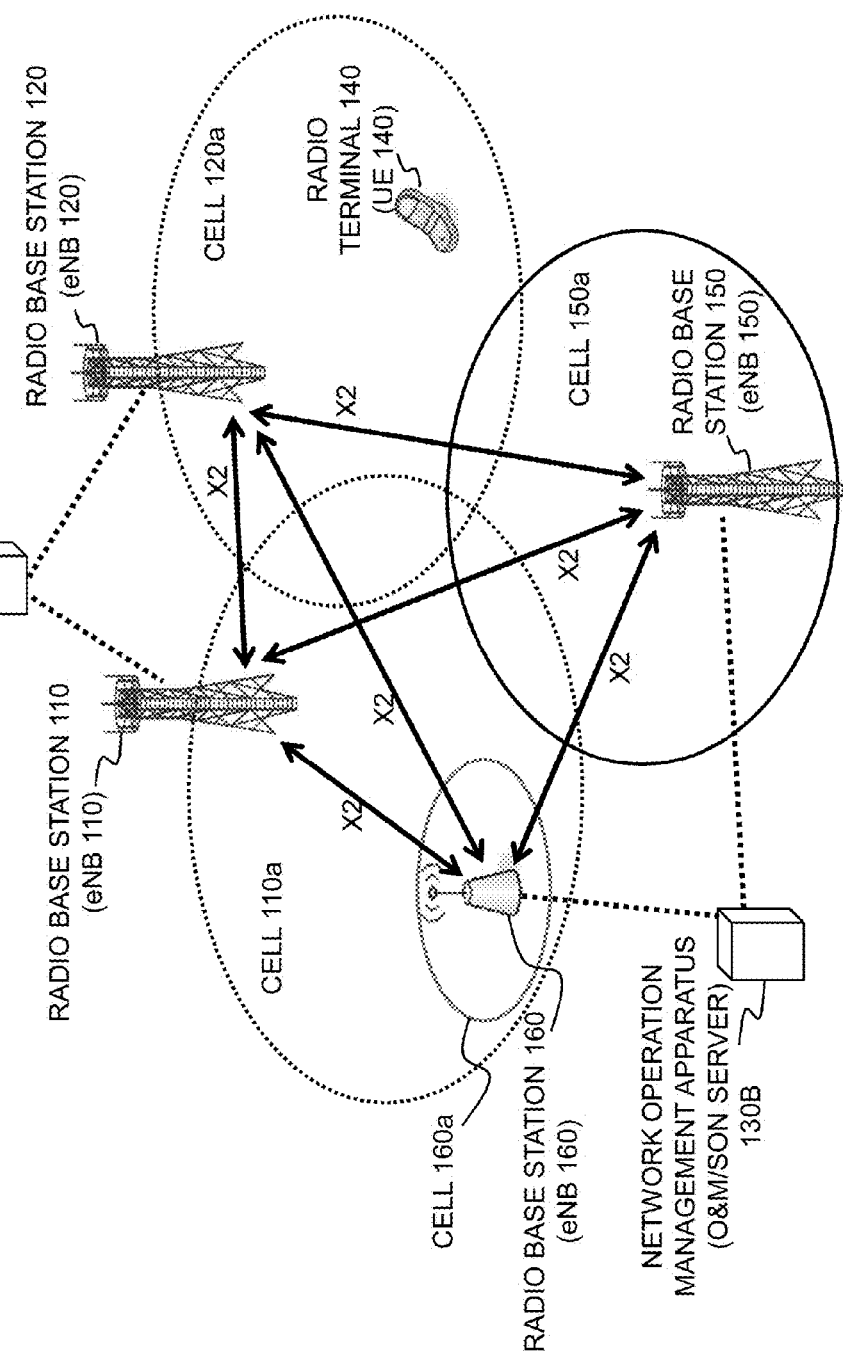
FIG. 10 is a system architecture diagrams for describing an outline of a 3GPP LTE system that is an example of the radio communication system according to the present invention.

Referring to FIG. 10, a radio communication system is assumed to include radio base stations (eNBs) 110, 120, 150 and 160 that manage cells 110a, 120a, 150a, and 160a, respectively, a network operation management apparatus (O&M or SON server) 130A that manages the radio base stations 110 and 120, a network operation management apparatus 130B that manages the radio base stations 150 and 160, and a radio terminal (UE) 140 that is located within any of the cells 110a, 120a, 150a and 160a and thus can communicate with a corresponding radio base station. However, it is assumed that the cell 160a is subsumed within the cell 110a.

Here, it is assumed that the radio base stations are directly connected to each other through interfaces (known as X2). Note that the radio base stations and network operation management apparatuses are connected to a core network (Evolved Packet Core (EPC)), and radio base stations that have not established an X2 interface can communicate with each other through interfaces with the EPC (known as S1), which is not shown in the drawing. The EPC can be further classified into a mobility management entity (MME) for radio terminals, a gateway (serving gateway (S-GW)), and the like.

In the system shown in FIG. 10, when a failure occurs in a radio base station (a first radio base station), a radio base station or network operation management apparatus that has detected this failure generates alarm information regarding this failure. Then, this alarm information is communicated between at least two of the first radio base station, its neighbour radio base station (a second radio base station), and the network operation management apparatus 130A or 130B. A radio base station or network operation management apparatus that has received this alarm information performs network optimization, or alternatively the first radio base station performs a self-recovery operation (e.g., device reboot) predefined as a countermeasure against this failure or is instructed to perform a self-recovery operation.

Here, in the LTE system, conceivable messages to communicate alarm information regarding a failure through the X2 interface include, but are not limited to, for example: messages on X2 Setup (X2 SETUP REQUEST, X2 SERTUP RESPONSE); messages on eNB Configuration Update (ENB CONFIGURAION UPDATE, ENB CONFIGURAION UPDATE ACKNOWLEDGE); messages on Cell Activation of a neighbour radio base station (CELL ACTIVATION REQUEST, CELL ACTIVATION RESPONSE); a message on Load Indication (LOAD INFORMATION); messages regarding Mobility Settings Change (MOBILITY CHANGE REQUEST, MOBILITY CHANGE ACKNOWLEDGE); messages on Resource Status Reporting Initiation/Resource Status Reporting (RESOURCE STATUS REQUEST, RESOURCE STATUS RESPONSE, RESOURCE STATUS UPDATE); and the like. It is needless to say that other messages may be newly defined.

Conceivable alarm information includes, for example:
Cell Outage Related Information related to a coverage problem in a cell of the first radio base station;
Radio Failure Related Information related to a failure in radio signal control by the first radio base station;
Inter Cell Interference (ICI) Related Information related to interference between a cell of the first radio base station and a cell of the second radio base station; and the like.

On the other hand, conceivable cell outage related information includes, for example:
information indicating the occurrence of a coverage problem (Cell Outage Notification);
information indicating the potential of a coverage problem (Potential Cell Outage Notification);
information for requesting to check the presence or absence of a coverage problem (Cell Outage Check Request);
information for suspecting a coverage problem (Cell Outage Suspicion Information);
information indicating that a coverage problem has been resolved (Cell Outage Recovery Information); and the like.

Further, the cell outage related information may be configured to also include:
cell identifier (Physical Cell Identity (PCI) or EUTRAN Cell Global Identity (CGI)) or radio base station identifier (eNB ID);
location information of a radio base station
information on processing scheduled to be executed on a side sending the cell outage information (execution information);
information on processing requested to a side receiving the cell outage information (request information); or the like.

The above-described information communicated between the first radio base station, second radio base station neighbouring thereon, and network operation management apparatus 130A or 130B as appropriate, whereby when a failure occurs in (a cell of) the first radio base station, it is possible to reduce an effect on (a cell of) the neighbour second radio base station, or by assisting the detection of the failure in (a cell of) the first radio base station, to perform this detection or recovery from this failure promptly.

In the radio communication system shown in FIG. 10, assuming that the radio base station 110 is the first radio base station in which a failure has occurred, then the radio base stations 120, 150 and 160 are the neighbour second radio base stations. In this case, the radio base station 110, where a failure has occurred, and the radio base station 120, one of the neighbour stations, are managed by the same network operation management apparatus 130A, while the radio base stations 150 and 160, the other neighbour stations, are managed by the different network operation management apparatus 130B. When the radio base stations are managed by (connected to) the different network operation management apparatus 130A and 130B as described above, the above-described alarm information may be configured to be communicated between these network operation management apparatus 130A and 130B. Hereinafter, examples of the present invention will be described in detail with reference to drawings, with a radio base station and a network operation management apparatus being abbreviated to eNB and O&M, respectively.

6.1) First Example

In an operation sequence in a radio communication system according to a first example of the present invention, it is assumed that the O&M 130A detects a failure (e.g., coverage shrink or the like) in the eNB 110 and instructs the eNB 110 to execute a self-recovery operation (e.g., reboot).

Referring to FIG. 11, first, the eNB 110 reports to the O&M 130A for network performance monitoring (PM), a report on UE measurement (UE Measurement Report) by the UE 140 in the cell 110a, a result of measurement of network performance-related service quality, service quality related information (e.g., a KPI) and the like as network measurement information (Operation 400; Measurement Reporting for PM). Similarly, the eNB 120 also reports a UE Measurement Report by a UE in the cell 120a, a predetermined KPI and the like to the O&M 130A.

It is assumed that a failure 01 has occurred in the eNB 110 (or cell 110a) at a certain point of time. Note that the eNB 110 is assumed to keep reporting network measurement information to the O&M 130A as long as a transceiver section used for communication with the O&M 130A is normal (Operation 402).

The O&M 130A detects the failure in the eNB 110 (or cell 110a) based on network measurement information (Operation 403; Problem detection). When detecting the occurrence of this failure, the O&M 130A instructs the eNB 110 to execute a predetermined self-recovery operation (Operation 404; Indication of self recovery activation), and the eNB 110 executes, for example, device reboot for the cell 110a as a self-recovery operation (Operation 406; Self recovery). Meanwhile, the O&M 130A notifies "information indicating the occurrence of a coverage problem" in the cell 110a as "alarm information" to the eNB 120 that manages the cell 120a neighbouring the cell 110a of the eNB 110 (Operation 405; Alarm information (Cell Outage Notification)). For example, the eNB 120, after receiving this alarm information, performs coverage extension for the cell 120a by increasing transmit power or decreasing antenna tilt angle (uptilting) in order to compensate for the original coverage of the cell 110a (not shown).

The eNB 110, after completing the self-recovery, reports this completion to the O&M 130A (Operation 07; Indication of self recovery completion). The O&M 130A, when receiving this report, notifies the eNB 120 of information indicating that the coverage problem in the cell 110a has been resolved (Operation 08; Alarm information (Cell Outage Recovery Notification)). The eNB 120 performs control to return to the state before the coverage of the cell 120a is extended, for example, by decreasing transmit power or increasing antenna tilt angle (downtilting).

Through the above-described operations, even when a failure such as a coverage problem has occurred in the cell 110a of the eNB 110, the O&M 130A that has detected this coverage problem notifies the neighbour eNB 120 of the occurrence of this coverage problem, whereby it is possible to avoid or mitigate system performance degradation following the creation of a dead spot due to the coverage problem (e.g., coverage shrink) with the cell 110a. Note that operations similar to those of the eNB 120 can be applied to other eNBs (not shown) neighbouring the eNB 110 if they are connected to the O&M 130A.

6.2) Second Example

In an operation sequence in a radio communication system according to a second example of the present invention, it is assumed that the eNB 110 itself detects a failure (e.g., coverage shrink or the like) in the eNB 110 and notifies alarm information to another eNB and the O&M 130A.

Referring to FIG. 12, a failure 500 occurs in the eNB 110, and the eNB 110 itself detects the occurrence of the failure 500 (Operation 501; Cell outage detection in eNB 110a/cell 110a).

Subsequently, as an option 1, the eNB 110 notifies the O&M 130A of "information indicating the occurrence of a coverage problem" as alarm information (Operation 502; Alarm information (Cell Outage Notification)), and the O&M 130A transfers this alarm information to the eNB 120 (Operation 503; Alarm information (Cell Outage Notification)). At this time, the alarm information is not transferred to the eNB 150 because the eNB 150 is not directly connected to the O&M 130A.

The invention claimed is:

1. A radio communication system, comprising:
   a plurality of radio stations; and
   a network operation management apparatus configured to manage the plurality of radio stations, wherein:
   at least one of a first radio station of the plurality of radio stations in which a failure occurs, a second radio station of the plurality of radio stations and different from the first radio station, and the network operation management apparatus is configured to send alarm information regarding the failure, wherein the alarm information is at least one of:
   cell outage information related to a coverage problem with a cell of the first radio station;
   radio failure information related to a failure in radio signal control by the first radio station; and
   inter-cell interference information related to interference between at least one cell of the first radio station and at least one cell of the second radio station; and wherein the radio failure information includes at least one of:
   information indicating a fault with a radio signal transceiver (RF);
   information indicating suspicion of a fault with the radio signal transceiver (RF);

information indicating a fault with a radio signal transmission section; and information indicating a fault with a radio signal reception section.

2. The radio communication system according to claim 1, wherein the network operation management apparatus is configured to detect the failure and provide the alarm information to at least one of the first radio station, the second radio station, and another network operation management apparatus.

3. The radio communication system according to claim 1, wherein the first radio station is configured to detect the failure and provide the alarm information to at least one of the second radio station and the network operation management apparatus.

4. The radio communication system according to claim 1, wherein a third radio station of the plurality of radio stations is configured to detect the failure and to provide the alarm information to at least one of the first radio station, the second radio station, and the network operation management apparatus.

5. A network healing method in a radio communication system, comprising:
determining occurrence of a failure in a first radio station of a plurality of radio stations managed by a network operation management apparatus; and
sending alarm information from at least one of the first radio station, a second radio station of the plurality of radio stations different from the first radio station, and the network operation management apparatus, wherein the alarm information is at least one of:
cell outage information related to a coverage problem with a cell of the first radio station;
radio failure information related to a failure in radio signal control by the first radio station; and
inter-cell interference information related to interference between at least one cell of the first radio station and at least one cell of the second radio station, and wherein the radio failure information includes at least one of:
information indicating a fault with a radio signal transceiver (RF);
information indicating suspicion of a fault with the radio signal transceiver (RF);
information indicating a fault with a radio signal transmission section; and
information indicating a fault with a radio signal reception section.

6. The network healing method according to claim 5, wherein a third radio station of the plurality of radio stations is configured to detect the failure and to provide the alarm information to at least one of the first radio station, the second radio station, and the network operation management apparatus.

7. A radio communication system, comprising:
a plurality of radio stations; and
a network operation management apparatus configured to manage the plurality of radio stations, wherein:
at least one of a first radio station of the plurality of radio stations in which a failure occurs, a second radio station of the plurality of radio stations and different from the first radio station, and the network operation management apparatus is configured to send alarm information regarding the failure, wherein the alarm information is at least one of:
cell outage information related to a coverage problem with a cell of the first radio station;
radio failure information related to a failure in radio signal control by the first radio station; and
inter-cell interference information related to interference between at least one cell of the first radio station and at least one cell of the second radio station; and wherein:
the network operation management apparatus is configured to detect the failure and provide the alarm information to at least one of the first radio station, the second radio station, and another network operation management apparatus.

8. The radio communication system of claim 7, wherein the alarm information is the radio failure information, and the radio failure information is information indicating a fault with a radio signal transceiver.

9. The radio communication system of claim 7, wherein the alarm information is the radio failure information, and the radio failure information is information indicating suspicion of a fault with a radio signal transceiver.

10. The radio communication system of claim 7, wherein the alarm information is the radio failure information, and the radio failure information is information indicating a fault with a radio signal transmission section.

11. The radio communication system of claim 7, wherein the alarm information is the radio failure information, and the radio failure information is information indicating a fault with a radio signal reception section.

12. A radio communication system, comprising:
a plurality of radio stations; and
a network operation management apparatus configured to manage the plurality of radio stations, wherein:
at least one of a first radio station of the plurality of radio stations in which a failure occurs, a second radio station of the plurality of radio stations and different from the first radio station, and the network operation management apparatus is configured to send alarm information regarding the failure, wherein the alarm information is at least one of:
cell outage information related to a coverage problem with a cell of the first radio station;
radio failure information related to a failure in radio signal control by the first radio station; and
inter-cell interference information related to interference between at least one cell of the first radio station and at least one cell of the second radio station; and wherein:
the first radio station is configured to detect the failure and provide the alarm information to at least one of the second radio station and the network operation management apparatus.

13. The radio communication system of claim 12, wherein the alarm information is the radio failure information, and the radio failure information is information indicating a fault with a radio signal transceiver.

14. The radio communication system of claim 12, wherein the alarm information is the radio failure information, and the radio failure information is information indicating suspicion of a fault with a radio signal transceiver.

15. The radio communication system of claim 12, wherein the alarm information is the radio failure information, and the radio failure information is information indicating a fault with a radio signal transmission section.

16. The radio communication system of claim 12, wherein the alarm information is the radio failure information, and the radio failure information is information indicating a fault with a radio signal reception section.

17. A radio communication system, comprising:
a plurality of radio stations; and
a network operation management apparatus configured to manage the plurality of radio stations, wherein:
at least one of a first radio station of the plurality of radio stations in which a failure occurs, a second radio station of the plurality of radio stations and different from the first radio station, and the network operation management apparatus is configured to send alarm information regarding the failure, wherein the alarm information is at least one of:
cell outage information related to a coverage problem with a cell of the first radio station;
radio failure information related to a failure in radio signal control by the first radio station; and
inter-cell interference information related to interference between at least one cell of the first radio station and at least one cell of the second radio station; and wherein:
a third radio station of the plurality of radio stations is configured to detect the failure and provide the alarm information to at least one of the first radio station, the second radio station, and the network operation management apparatus.

18. The radio communication system of claim 17, wherein the alarm information is the radio failure information, and the radio failure information is information indicating a fault with a radio signal transceiver.

19. The radio communication system of claim 17, wherein the alarm information is the radio failure information, and the radio failure information is information indicating suspicion of a fault with a radio signal transceiver.

20. The radio communication system of claim 17, wherein the alarm information is the radio failure information, and the radio failure information is information indicating a fault with a radio signal transmission section.

21. The radio communication system of claim 17, wherein the alarm information is the radio failure information, and the radio failure information is information indicating a fault with a radio signal reception section.

* * * * *

UNITED STATES PATENT AND TRADEMARK OFFICE
CERTIFICATE OF CORRECTION

PATENT NO. : 9,930,551 B2
APPLICATION NO. : 15/336575
DATED : March 27, 2018
INVENTOR(S) : Futaki et al.

It is certified that error appears in the above-identified patent and that said Letters Patent is hereby corrected as shown below:

On the Title Page

Item [57], Line 11, "different from the first ration station," should read --different from the first radio station,--.

Signed and Sealed this
Nineteenth Day of June, 2018

Andrei Iancu
*Director of the United States Patent and Trademark Office*